(12) United States Patent
Lee et al.

(10) Patent No.: US 7,505,643 B2
(45) Date of Patent: Mar. 17, 2009

(54) APPARATUS AND METHOD FOR IDENTIFICATION OF OPTICAL CABLE

(75) Inventors: Yong-Gi Lee, Daejeon (KR);
Kyeong-Mo Youn, Daejeon (KR);
Hyun-Ho Jeong, Daegu (KR);
Kyoung-Seon Min, Daejeon (KR);
Ho-Jin Jeong, Daejeon (KR);
Bong-Wan Lee, Daejeon (KR)

(73) Assignee: KT Corporation, Kyeonggi-Do (KR)

( * ) Notice: Subject to any disclaimer, the term of this patent is extended or adjusted under 35 U.S.C. 154(b) by 132 days.

(21) Appl. No.: 11/508,743

(22) Filed: Aug. 23, 2006

(65) Prior Publication Data

US 2007/0196058 A1    Aug. 23, 2007

(30) Foreign Application Priority Data

Aug. 23, 2005    (KR) ............... 10-2005-0077441
Aug. 18, 2006    (KR) ............... 10-2006-0078111

(51) Int. Cl.
*G02F 1/295* (2006.01)
(52) U.S. Cl. .......................................... 385/13; 385/7
(58) Field of Classification Search .............. 385/7, 385/13
See application file for complete search history.

(56) References Cited

U.S. PATENT DOCUMENTS 5,122,750 A    6/1992    Rippingale et al.

5,311,592 A *    5/1994    Udd ............................ 380/256

FOREIGN PATENT DOCUMENTS

| EP | 0513381 A1 | 11/1992 |
|---|---|---|
| EP | 0592690 A1 | 4/1994 |
| GB | 2241325 A | 8/1991 |
| JP | 01-101504 | 4/1999 |

OTHER PUBLICATIONS

Search Report issued on Nov. 16, 2007 in corresponding European patent application No. 06291339.7 in 7 pages.

* cited by examiner

*Primary Examiner*—Jerry T Rahll
(74) *Attorney, Agent, or Firm*—Knobbe Martens Olson & Bear, LLP

(57) ABSTRACT

In order to identify an optical cable for optical communication from a remote place, a Sagnac interferometer including two strands of an optical fiber is formed in the optical cable, and a worker in the remote place applies a disturbance of a popping sound to an optical cable to be identified. The disturbance applied by the worker is detected and regenerated in the form of a sound. The optical cable can be easily identified by comparing the regenerated signal and the disturbed signal in the remote place to thereby prevent an incorrect optical cable from being cut. In addition, the optical cable can be more precisely identified by selecting a different light detecting frequency component in accordance with environment conditions.

16 Claims, 8 Drawing Sheets

APPARATUS AND METHOD FOR IDENTIFICATION OF OPTICAL CABLE

CROSS-REFERENCE TO RELATED APPLICATION

This application claims priority to and the benefits of Korean Patent Application Nos. 10-2005-0077441 and 10-2006-0078111 respectively filed in the Korean Intellectual Property Office on Aug. 23, 2005 and Aug. 18, 2006, the entire contents of which are incorporated herein by reference.

BACKGROUND OF THE INVENTION (a) Field of the Invention

The present invention relates to an optical cable identification apparatus. More particularly, the present invention relates to a method for identifying an optical cable in a remote place, and an apparatus using the same. Herein, the remote place refers to a place (e.g., a manhole) remote from a central office where communication equipment is located.

(b) Description of the Related Art

In general, a phone line or other communication line is connected between one central office to another central office, and a plurality of manholes are provided between the central offices for convenience of maintenance, repair, and replacement of the line.

Substantially, when a plurality of optical cables are installed in a manhole, the optical cables need to be branched or relocated often. In this case, there is a possibility of cutting a cable path in a communication state when a wrong cable is selected. Therefore, it is very important to identity the correct optical cable to be cut before starting a cutting process.

Conventionally, a cable is identified by physically pulling a cable from a neighboring manhole or by using electromagnetic induction. However, there is a problem in application of the electromagnetic induction to identify an optical cable. A metal line must be included in the cable for inducing electricity, but most cables today do not have a metal line, and metal lines may be disconnected from each other through a manhole.

In addition, according to another conventional method, light beams are entered into an end of an optical fiber and the optical fiber is bent in the middle. Then light is output from the other end of the optical fiber such that the optical fiber can be identified. However, this method also has a problem in directly accessing an optical fiber surrounded by a cable.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an optical cable identification apparatus that can be applied to an optical cable and has advantages of precise identification of an optical cable, and a method thereof.

An exemplary optical cable identification apparatus according to one embodiment of the present invention identifies an optical cable by loop-backing one end of each of two strands of an optical fiber in an optical cable to be identified, and applying a disturbance to the optical cable to be identified.

The optical cable identification apparatus includes an optical unit, a signal processor, and a voice output unit. The optical unit applies light to the two strands of an optical fiber in the optical cable to be identified after phase-modulating the light to a predetermined modulation frequency, interferes the light applied to the two strands in opposite directions, and detects and outputs light having a different intensity resulting from a phase difference due to the phase modulation and a phase difference due to the disturbance of the light of the optical cable. The signal processor eliminates a noise from a signal output from the optical unit, demodulates the signal to a voice signal, and outputs the voice signal. The voice output unit outputs the voice signal of the signal processor as a sound.

In addition, the optical cable identification apparatus may further include a communication apparatus for transmitting a sound regenerated from the voice output unit to a worker in a remote site.

In addition, the signal processor may delay outputting of the signal detected by the optical unit to easily distinguish a regenerated sound transmitted through a communication apparatus from a disturbance signal applied to the optical cable by a worker in a remote site and regenerate the signal into a voice signal.

The optical unit includes a light source generator, a light detector, an optical directional coupler, a phase modulator, and a depolarizer. The light source generator generates light. The light detector detects light. The optical directional coupler has two arms in each of a first direction and a second direction. The first direction is opposite to the second direction, a first arm in the first direction is connected to the light source generator, a second arm in the first direction is connected to the light detector, and the two arms in the second direction are connected with two strands of an optical fiber. Herein, the two strands of the optical fiber are looped back and form a ring. The phase modulator is connected to the first arm in the second direction, phase-modulates the light output from the optical direction coupler, and applies the phase-modulated light to the optical fiber of the optical cable. The depolarizer is connected to the second arm in the second direction and stabilizes an interference signal by eliminating a polarization component from input light.

The phase modulator, the optical directional coupler, the optical fiber of the optical cable, and the depolarizer may function as an optical fiber interferometer, and it is preferred that the optical fiber interferometer is a Sagnac interferometer.

The signal processor includes a switch, a controller, a function generator, and an amplitude extractor. The switch selects a demodulation frequency. The controller controls an output of a demodulation frequency that corresponds to the selection of the switch. The function generator supplies a constant modulation frequency to the optical unit and outputs a demodulation frequency that corresponds to a control signal of the controller. The amplitude extract unit extracts an amplitude of a demodulation frequency component from the signal output from the optical unit. Herein, the modulation frequency component is output from the function generator.

The controller outputs a warning signal when the amplitude of the amplitude extract unit is saturated, and the signal processor may further include a first mixer for mixing the warning signal and a signal of the amplitude extract unit and outputting the mixed result.

The voice output unit includes a first jack, a second jack, a third jack, a second mixer, and a third mixer. The first jack is connected to a mobile phone. The second jack is connected to a speaker. The third jack is connected to a microphone. The second mixer transmits an output of the mobile phone through the first jack and an output of the first mixer to the speaker through the second jack. The third mixer transmits the output of the first mixer and an input to the microphone through the third jack to the mobile phone through the first jack.

An exemplary method for identifying an optical cable according to another embodiment of the present invention identifies an optical cable by looping back one end of each of two strands of an optical fiber in an optical cable to be identified.

The method includes: applying light to the two strands of optical fiber of the optical cable, phase-modulating the light applied to the two strands of optical fiber at a predetermined modulation frequency and modulating a phase difference of the interfering lights at the modulation frequency, additionally generating a phase difference due to an external disturbance between the interfering lights of the optical cable, measuring a phase difference due to the disturbance by demodulating a light signal, converting the light signal into a voice signal, and outputting the voice signal, wherein intensity of the light signal is modulated by the disturbance.

DETAILED DESCRIPTION OF EMBODIMENTS

Figure 1:
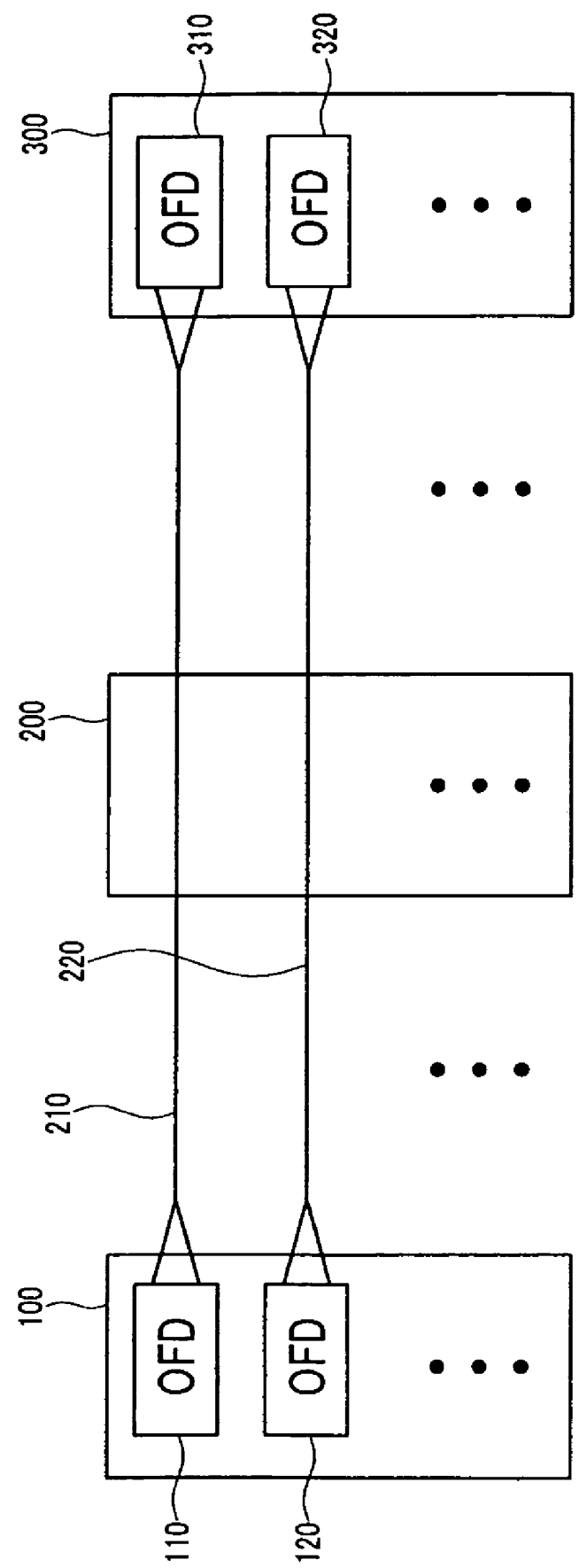
FIG. 1 shows a central office and a manhole with application of an optical cable identification apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, throughout this specification and the claims which follow, unless explicitly described to the contrary, the word "comprise" and variations such as "comprises" or "comprising" will be understood to imply the inclusion of stated elements but not the exclusion of any other elements.

FIG. 1 shows a connection relationship of optical cables to be applied to the present invention.

Referring to FIG. 1, a plurality of optical cables are connected between a central office 100 and a central office 300 through at least one manhole 200. The respective central offices include a plurality of optical fiber distributors (OFDs). For convenience of description, FIG. 1 exemplarily shows two optical cables 210 and 220, two central offices 100 and 300, one manhole 200, and four ODFs 110, 120, 310, and 320.

Various signals are transmitted to a desired destination through the optical cables by control of the OFDs 110, 120, 310, and 320, and the OFDs may be omitted as necessary.

Figure 2:
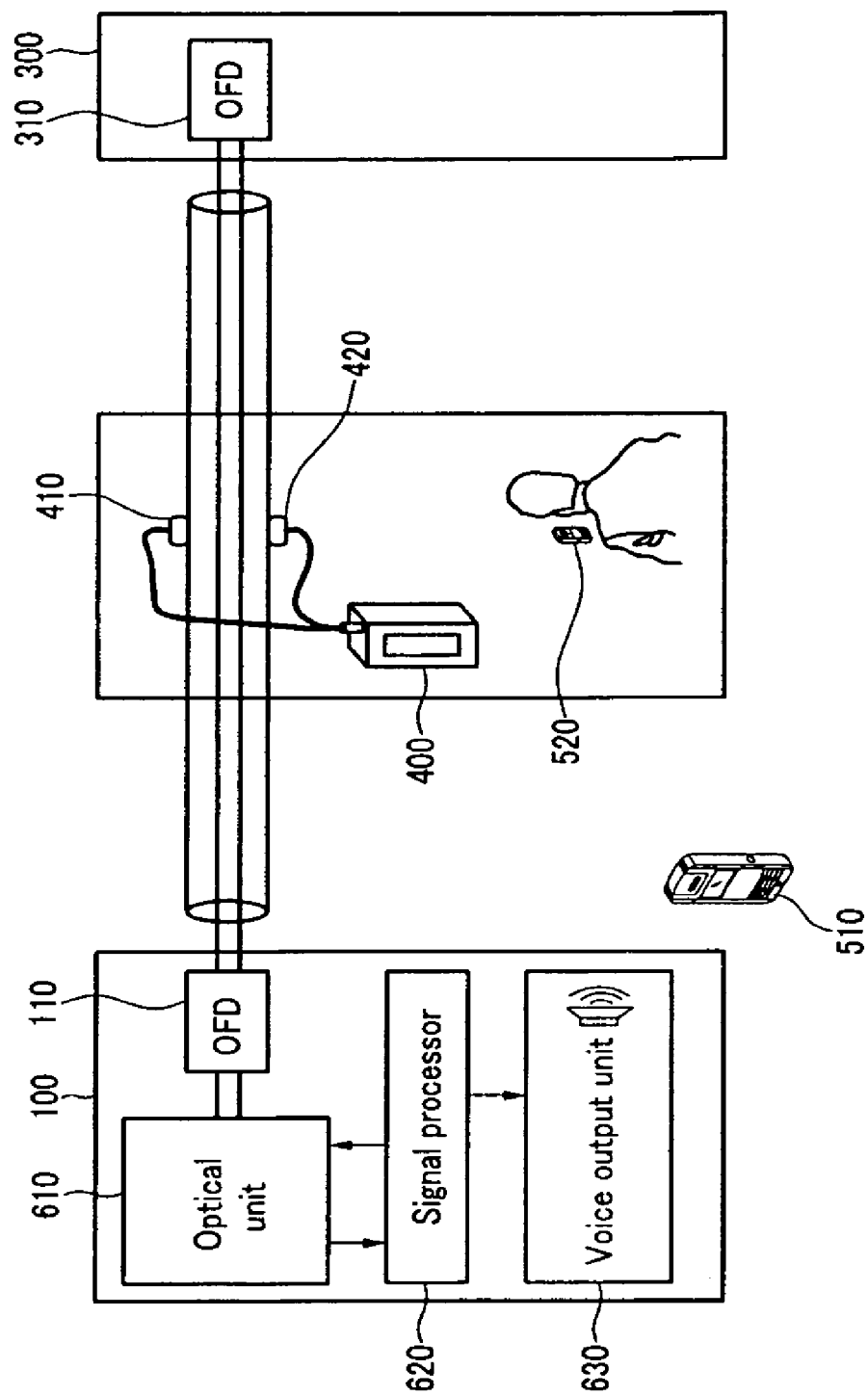
FIG. 2 is a schematic diagram of the optical cable identification according to the exemplary embodiment of the present invention.

FIG. 2 is a schematic diagram of an optical cable identification apparatus according to the exemplary embodiment of the present invention.

As shown in FIG. 2, the optical cable identification apparatus includes an optical unit 610, a signal processor 620, and a voice output unit 630. For convenience of description and better understanding, FIG. 2 exemplarily shows one OFD for each central office among the plurality of OFDs of FIG. 1.

In the present exemplary embodiment, after first ends of two strands of an optical fiber in the optical cable 210 are looped back and second ends of the two strands are applied with light, a disturbance is applied to the optical cable and light that varies due to the disturbance is extracted such that the optical cable is identified. In this case, the optical unit 610 phase-modulates light and applies the phase-modulated light to the two strands of the optical fiber in the optical cable 210. Then, the optical unit 610 interferes the light having returned in opposite directions, detects the intensity of the light, and outputs the detection result. The signal processor 620 eliminates noise from a signal output from the optical unit 610, demodulates the signal to a voice signal, and outputs the voice signal. The voice output unit 630 can be realized as a speaker, and outputs the voice signal from the signal processor 620 as a sound.

In addition, the optical cable identification apparatus may further include communication apparatuses 510 and 520 so as to transmit the sound regenerated from the voice output unit 630 to a worker in a remote site. The communication apparatus may be realized as a mobile phone or a radio. The signal processor 620 may delay a signal detected by the optical unit 610 for a predetermined time, and regenerate the signal as a voice signal in order to easily identify a disturbance signal that the worker in the remote site applies to the optical cable and a regenerated voice signal delivered through the communication apparatuses 510 and 520.

Figure 3:
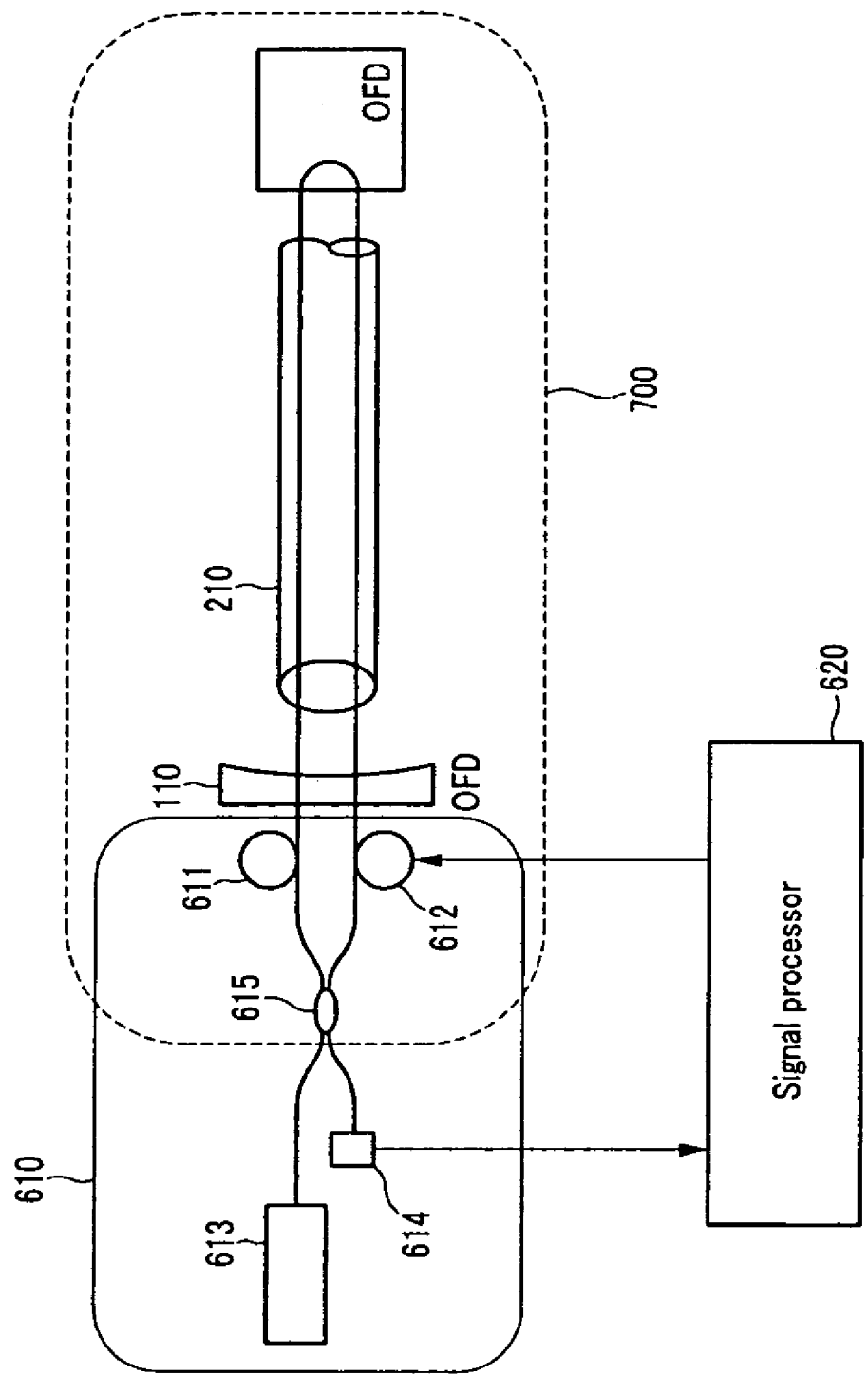
FIG. 3 shows an optical unit and a Sagnac interferometer.

FIG. 3 shows a configuration of the optical unit and a Sagnac interferometer according to the exemplary embodiment of the present invention.

As shown in FIG. 3, the optical unit 610 includes a light source generator 613, a light detector 614, an optical directional coupler 615, a phase modulator 612, and a depolarizer 611. Herein, the light detector 614 is realized as a photo diode (PD) according to the exemplary embodiment of the present invention. The light source generator 613 is a light source and generates light. The light detector 614 detects light received at the optical directional coupler 615 and outputs the detected light.

The optical directional coupler 615 has two arms in each of a first direction and a second direction that is opposite to the first direction. A first arm of the first direction is connected to the light source generator 613 and a second arm thereof is connected to the light detector 614 such that light generated from the light source generator 613 is coupled.

The phase modulator 612 is connected to a first arm of the second direction of the optical directional coupler 615, phase-modulates the light output from the optical directional coupler 615, and applies the phase-modulated light to an optical fiber in the optical cable 210.

The depolarizer 611 is connected to a second arm of the second direction, and eliminates polarized light from a received light and transmits the depolarized light to the optical directional coupler 615. In addition, the phase modulator 612, the optical directional coupler 615, the optical fiber in the optical cable 210, and the depolarizer 611 form a Sagnac interferometer 700.

A light source of the Sagnac interferometer 700 is connected to an arm in a direction of a 2*2 optical directional coupler 615, and two arms in the opposite direction are connected to first ends of two strands of the optical fiber in the optical cable 210. Second ends of the two strands of the optical fiber are connected to each other and form a ring-type interferometer. With such a configuration, light generated from the light source generator 613 is divided in the optical directional coupler 615. The divided light beams flow in opposite directions through the optical fiber ring, and meet each other in the optical direction coupler 615 and then the light is interfered therein.

Such an interference signal is detected by the light detector 614 connected to the other arm of the 2*2 optical directional coupler 615.

It is preferred that the light source of the Sagnac interferometer 700 is a light source having a line width of a 1550 nm communication band. As an example, the preferred light source may be provided as an amplified spontaneous emission (ASE) using an erbium doped fiber (EDF) or a super luminescent diode (SLD).

When using the SDL included in a polarization component as a light source among the light sources, it is preferred to additionally use a depolarizer (not shown) for reducing a polarization degree of the SDL. Herein, the depolarizer is located at a rear end of the SDL. When using the ASE as a light source, an additional use of a polarizer does is not needed since the ASE is in a non-polarization state.

Figure 4:
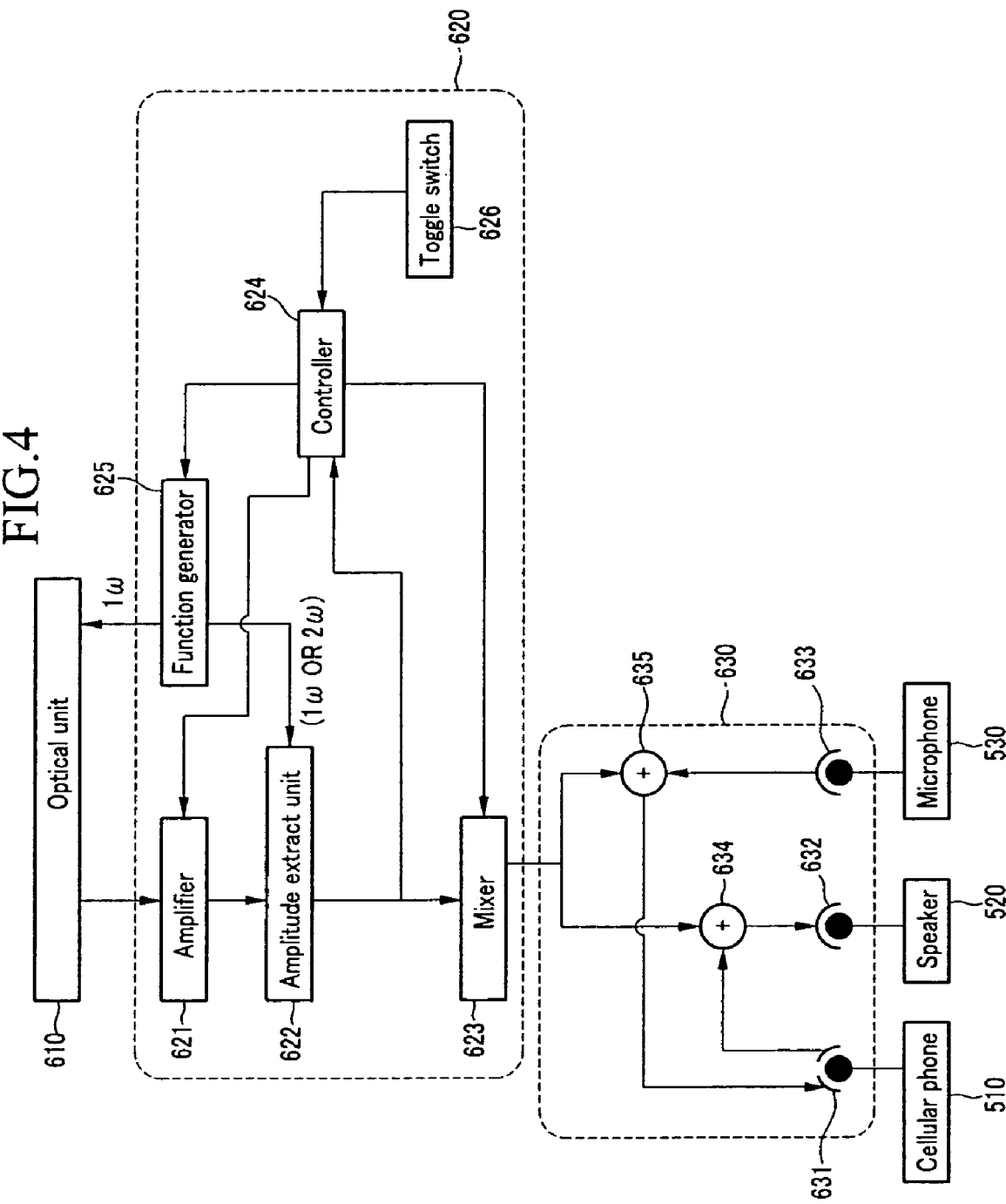
FIG. 4 is a schematic diagram of a signal processor and a voice output unit of FIG. 3.

FIG. 4 is a schematic diagram of the signal processor and the voice output unit of FIG. 3.

As shown in FIG. 4, the signal processor 620 includes an amplifier 621, an amplitude extract unit 622, a function generator 625, a controller 624, a mixer 623, and a toggle switch 626.

The amplifier 621 amplifies an output signal of the optical unit 610, receives a gain value from the controller 624, and determines an amplification degree based on the gain value. The amplitude extract unit 622 extracts an amplitude from a signal output from the amplifier 621, and extracts an amplitude that corresponds to a demodulation frequency component transmitted from the function generator 625.

The function generator 625 transmits a modulation frequency signal to the optical unit 610 and a demodulation frequency signal to the amplitude extract unit 622 according to a control signal of the controller 624. The controller 624 outputs a control signal to the function generator 625 for selection of the corresponding demodulation frequency according to a signal of the toggle switch 626, controls a gain of the amplifier 612, and outputs a warning signal when the amplitude of the amplifier 621 is saturated. The mixer 623 mixes the warning signal and a signal of the amplitude extract unit and outputs a mixed signal. The toggle switch 626 receives a user's selection on a demodulation frequency in the form of a toggle, and it may be omitted when the demodulation frequency has a fixed value.

As shown in FIG. 4, the voice output unit 630 includes jacks 631, 632, and 633, and mixers 634 and 635.

Figure 5:
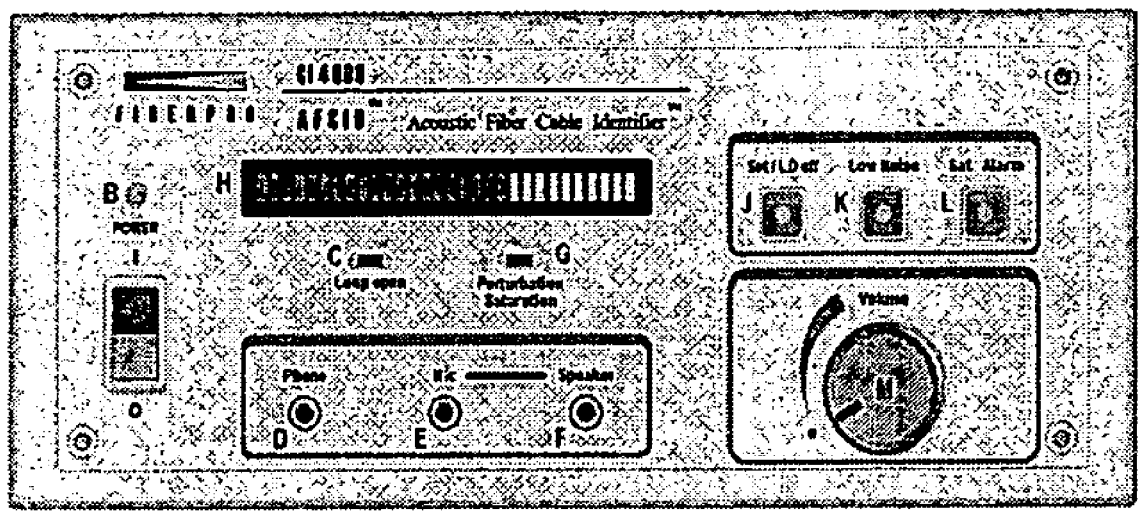
FIG. 5 shows an external appearance of the optical cable identification apparatus according to the exemplary embodiment of the present invention.

The jack 631 is connected to the mobile phone 510 and inputs/outputs data, and the jack 632 transmits an output of the mixer 634 to the speaker 520 for outputting a sound through the speaker 520. The jack 633 receives an output of the microphone 530 and transmits the output to the mixer 635. The mixer 634 mixes outputs of the mobile phone 510 and the mixer 623 and transmits the mixed output to the jack 632, and the mixer 635 transmits inputs of the microphone 530 and the mixer 623 to the jack 631. FIG. 5 shows an exterior appearance of a product having the jacks 631, 632, and 633 of the voice output unit 630. As shown in FIG. 5, the product may further have a volume controller for controlling volume of the speaker or a power button.

Operation of the optical cable identification apparatus according to the exemplary embodiment of the present invention will now be described in more detail.

The optical unit 610 is connected to the OFD 110 of the central office 100 as shown in FIG. 2, and an optical fiber of the OFD 110 of the corresponding optical cable 210 of another central office is short-circuited and is thus looped back. In this way, a Sagnac interferometer is formed.

With such an optical configuration, light generated from the light source generator 613 is divided into two beams and inputted to an optical cable to be identified. The two input beams pass the optical cable 210 in opposite directions with each other and meet each other at the optical directional coupler 615 and form an interference signal in the light detector 614.

In order to describe an initialization process and an optical cable identification process of the optical cable identification apparatus, a modulation-demodulation process used for signal processing will now be described.

An output signal I(t) of the interferometer is phase-modulated to each frequency ω and amplitude $\phi_m$, as given as Equation 1.

$$I(t) = \frac{I_0}{2}(1 - V\cos(\phi_m \sin(\omega t) + \phi_p)) \quad \text{[Equation 1]}$$

where V is a constant number and denotes visibility of the interferometer, and $\phi_p$ denotes the size of a disturbance that the worker at the remote site applies to the optical cable and corresponds to a desired amount of $\phi_p$ to be extracted through the described signal processing.

Equation 1 may be expressed as a sum of several frequency components by using an equation of a Bessel function as shown in Equation 2.

$$I(t) = \frac{I_0}{2}(1 - VJ_0(\phi_m)) + I_0 V \sin\phi_p \sum_{n=0} J_{2n+1}(\phi_m)\sin((2n+1)\omega t) - I_0 V \cos\phi_p \sum_{n=1} J_{2n}(\phi_m)\cos(2\omega t) \quad \text{[Equation 2]}$$

From Equation 2, an output ($I_0 V J_1(\phi_m)\sin(\phi_p)$) that is proportional to $\sin(\phi_p)$ can be obtained by using a lock-in detection scheme, and an output ($I_0 V J_2 \cos(\phi_p)$) that is proportional to $\cos(\phi_p)$ can be obtained by measuring an amplitude of a 2ω frequency component (i.e., a cos(2ωt) component).

The signal process is configured as shown in FIG. 4 so as to extract a ω frequency component (i.e., sin(ωt) component) and a 2ω frequency component (i.e., cos(2ωt) component).

That is, the amplification extractor extracts a component corresponding to a frequency of a demodulated signal input thereto.

In the present exemplary embodiment, the initialization process of the optical cable identification apparatus is a process for maximizing an amplitude of an alternating current signal applied to the phase-modulator and an amplification degree of a light detect circuit. The initialization process of the optical cable identification apparatus will now be described.

The initialization process is performed by a 2ω component extract circuit through the follows steps.

Step 1: Drive the phase modulator in the function generator 625 at a predetermined frequency (1ω). For example, a modulation amplitude of the phase modulator is set to be less than 2 radians so as to set a valid phase modulation amplitude of the interferometer to be less than 4 radians.

Step 2: Search a phase of a demodulation signal that maximizes an output of a direct current (DC) component of the amplitude extract unit 622 by setting a frequency of a reference signal to 2F. In the present exemplary embodiment, the amplitude extract unit is realized as a lock-in amplifier.

Step 3: Search the size of amplitude that makes an output of a direct current component of the amplitude extract unit 622 equal zero while changing intensity of a signal applied to the phase modulator. In this case, the valid phase modulation amplitude searched in Step 3 corresponds to 5.13 radians, which makes the Bessel function J2 equal zero.

Step 4: Determine a specific valid phase modulation amplitude (e.g., 2.6 radians) from the voltage vs. amplitude searched in Step 3.

Step 5: Set an amplification degree of the amplification circuit to set the DC component of the lock-in amplifier to correspond to a specific value, i.e., 1V.

After the above-described preliminary setting process is performed, the optical cable identification process is performed.

The worker at the remote site connects vibrators 410 and 420 to an optical cable to be identified, and applies a sound to the optical cable through vibrators 410 and 420. The sound may include a popping or crackling sound, or a melody generated by a vibrator driver 400 such as an MP3 player.

Then, two interfering beams are disturbed by the sound from the vibrator driver 400 and thus they have a phase difference. The phase difference is detected as an intensity difference of the light, and the signal processor 620 regenerates a signal applied from a disturbance signal modulated by using a lock-in detection mechanism.

This will now be described in more detail.

A user selects a desired demodulation frequency component by using a toggle switch 626.

Then, the controller 624 outputs a control signal to the function generator 625 for selection of the corresponding demodulation frequency according to an output signal of the toggle switch 626, the function generator 625 transmits a demodulation frequency signal to the amplitude extract unit 622 according to the control signal of the controller 624, and the amplitude extract unit 622 extracts an amplitude that corresponds to the frequency component transmitted from the function generator 625.

In addition, the controller 624 checks the amplitude output from the amplitude extract unit 622 and outputs a warning signal when the amplitude is saturated.

The mixer 623 mixes the warning signal and a signal of the amplitude extract unit 622 and outputs a mixed result.

As described above, an output that is proportional to $\sin(\phi_p)$ is obtained when the amplitude extract unit 622 measures an amplitude of a sin(ωt) component by using the lock-in detection mechanism, and an output that is proportional to $\cos(\phi_p)$ is obtained when the extractor 622 measures an amplitude of a cos (2ωt) component. Merits of the output that is proportional to the $\sin(\phi_p)$ are a sensitive response to a small $\phi_p$ and a high reproducibility of a disturbance signal, but it also has a drawback of being sensitive to external noise. On the contrary, the output that is proportional to $\cos(\phi_p)$ has drawbacks of not sensitively responding to a small $\phi_p$ and a low reproducibility of the disturbance signal, but it also a merit of not being sensitive to external noise. Therefore, the user may have a selectively choice between the sin(ωt) component and the cos(2ωt) component through the lock-in amplifier in the signal processor 620 as necessary, such that noise generated due to an environment where the optical cable 210 is installed can be efficiently handled. For this purpose, the toggle switch 626 is provided in a front side of the optical cable identification apparatus for selection of the sin(ωt) component and the cos(2ωt) component.

The voice output unit 630 outputs the regenerated voice signal as a sound, and this will now be described in more detail.

The mixer 634 mixes an input of the mobile phone 510 and an output of the mixer 623 and transmits the mixed result to the jack 632, and an output of the jack 632 is output through the speaker 520. The input of the mobile phone 510 is input through the jack 631.

Then, the mixer 635 transmits an input through the jack 633 to the microphone 530 and an output of the mixer 623 to the jack 631, and an output of the jack 631 is output through the mobile phone 510.

In addition, as necessary, an output of the voice output unit 630 may be provided in a form that can be input to a earphone (or a microphone) jack of a wireless phone such that the output of the voice output unit 630 can be transmitted to a worker who is disturbing the optical cable 210 in a location where the signal processor 620 is located in the remote site through a wireless phone.

For the case that a sound generated when the worker at the remote site applies a disturbance and a sound transmitted through a wireless phone is simultaneously heard, the signal processor 620 outputs an output signal after a constant time delay such that a time that that worker in the remote site applies the disturbance signal and a time that the regenerated disturbance signal is transmitted through a phone can be differentiated, and the two sounds can be easily distinguished.

When the signal applied by the worker and the sound heard through the communication apparatuses 510 and 520 are identical, the worker determines that the correct optical cable 210 has been selected and continues work.

However, when the sound that the worker has applied and the sound heard from the communication apparatus are not identical, the vibrator is connected to another optical cable and the above-described process is repeated until the sound that the worker has applied and the sound heard through the communication apparatus are identical such that the correct optical cable is identified. In addition, a signal can be applied by tapping the optical cable, as necessary.

When the warning sound is heard, the amplitude of the output signal is in a saturation state, the worker does not need to tap the optical cable harder, and therefore the size of an output will be the same as previous output even if the optical cable is tapped harder.

Figure 6:
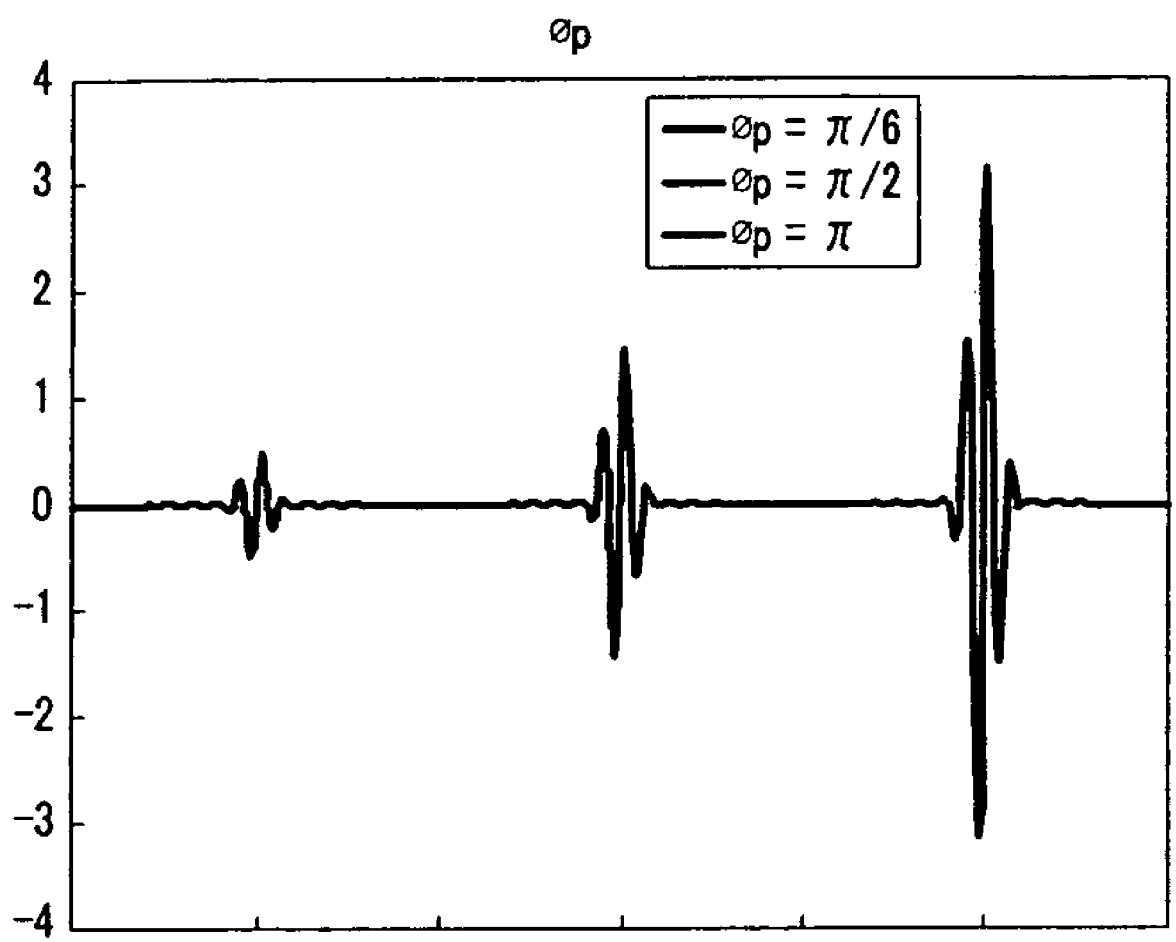
FIG. 6 shows a value of $\phi_p$.

Referring to FIG. 6, a value of $\phi_p$ increases according to a tapping degree.

Figure 7:
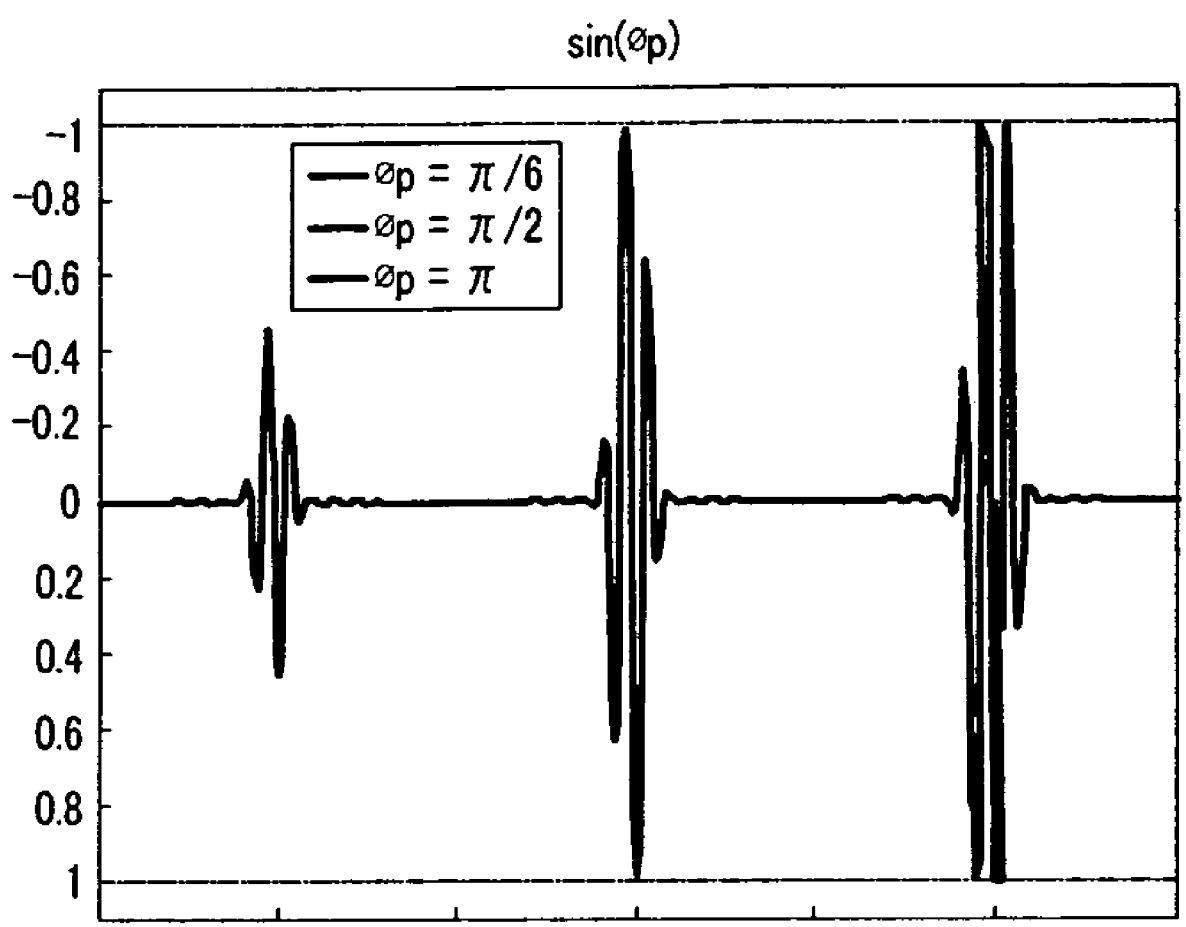
FIG. 7 shows a value of a $\sin(\phi_p)$ component that corresponds to $\phi_p$ of FIG. 6.

However, a $\sin(\phi_p)$ component obtained from the amplitude extract unit 622 will be the same after the $\sin(\phi_p)$ component exceeds a constant value (Π/2) as shown in FIG. 7, and a $\cos(\phi_p)$ component becomes saturated after the $\cos(\phi_p)$ component exceeds a constant value.

Figure 8:
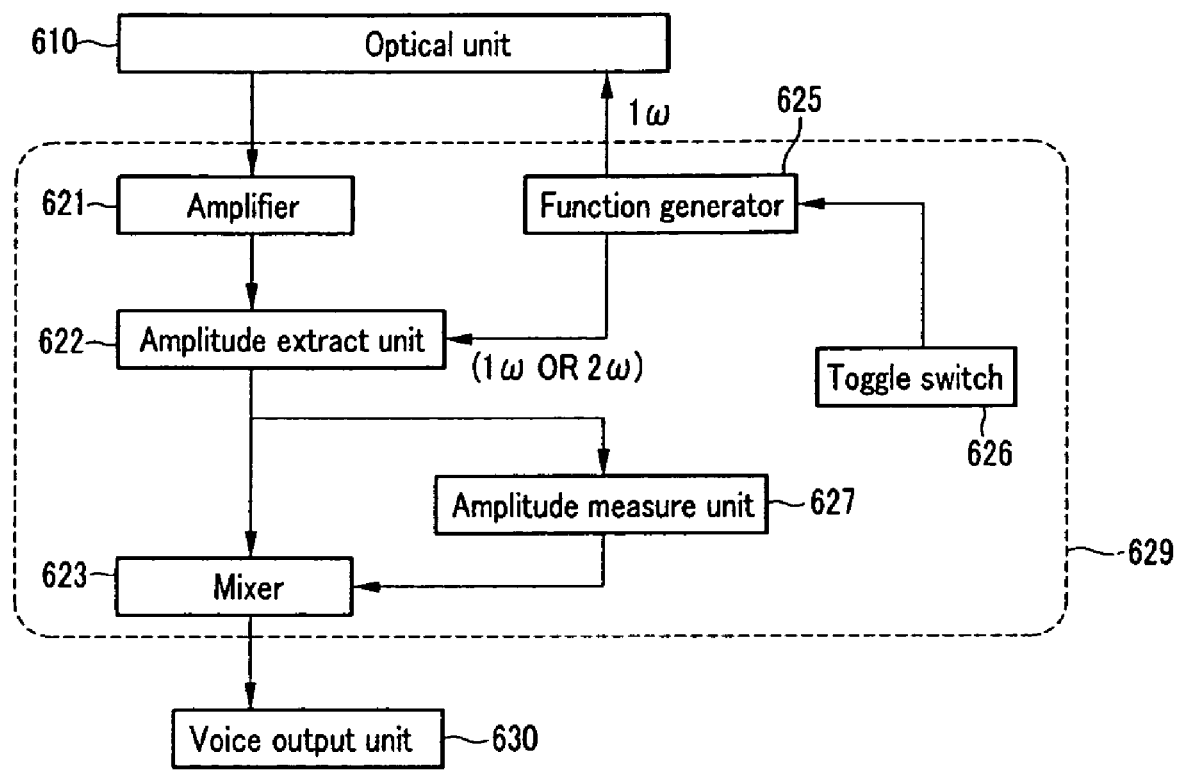
FIG. 8 shows a signal process according to another exemplary embodiment of the present invention.

In the above-described process, the signal processor 620 can be variously modified, and FIG. 8 shows one example of the modification.

As shown in FIG. 8, the signal processor 629 includes an amplifier 621, an amplitude extract unit 622, a function generator 625, an amplitude measure unit 627, a mixer 623, and a toggle switch 626.

The function generator 625 transmits a frequency signal to the optical unit 610 and the amplitude extract unit 622 according to a selection signal of the toggle switch 626, and substantial functions of the function generator 625 are the same as in the previous description. The amplitude measure unit 627 outputs a warning signal when an amplitude extracted by the amplitude extract unit 622 is saturated. The rest of the constituent elements of the signal processor 629 are the same as those of the signal processor 620, and therefore a detailed description will be omitted.

The signal extractor 629 can be realized as a simple device.

In the above-stated process, the voice output unit 620 can be omitted as necessary. In this case, the speaker may replace the voice output unit 620. The embodiment of the present invention can be variously modified within the spirit and scope of the appended claims.

As described above, a worker disturbs a signal by tapping an optical cable that the worker wants to identify, and the disturbance is extracted through an optical fiber interferometer and transmitted to the worker through a communication apparatus such that the worker can precisely identify the optical cable by determining whether the disturbance signal and the extracted signal are the same.

According to the embodiment of the present invention, an apparatus and a method for easily and accurately identifying an optical cable that a worker in a remote site needs to cut off to thereby efficiently prevent an incorrect optical cable from being cut off.

In addition, an optical cable can be more accurately identified by selecting a frequency according to an environmental condition of a remote site, and the worker does not need to tap an optical cable harder than necessary in accordance with to a saturation state.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical cable identification apparatus for identifying an optical cable by looping-back one end of each of two strands of optical fiber in an optical cable to be identified and applying a disturbance to the optical cable to be identified, the optical cable identification apparatus comprising:

an optical unit configured to apply light to the two strands of the optical fiber in the optical cable to be identified after phase-modulating the light at a predetermined modulation frequency, interfere the light applied to the two strands in opposite directions, and detect light having a different intensity resulting from a phase difference due to the phase modulation and a phase difference due to the disturbance of the optical cable;

a signal processor configured to receive a signal of the detected light, and demodulate the signal to an audio signal; and a sound output unit configured to receive the audio signal from the signal processor and transform the audio signal into a sound, wherein the signal processor is configured to delay outputting of the signal for a predetermined period to facilitate distinguishing the sound from the disturbance applied to the optical cable by a worker in a remote site.

2. The optical cable identification apparatus of claim 1, wherein the optical unit comprises:

a light source generator configured to generate light, a light detector configured to detect light;

an optical directional coupler comprising two arms in each of a first direction and a second direction, wherein the first direction is opposite to the second direction, a first arm in the first direction is connected to the light source generator, a second arm in the first direction is connected to the light detector, the two arms in the second direction are connected with the two strands of the optical fiber, and the two strands of the optic fiber are looped-back and form a ring;

a phase modulator connected to the first arm in the second direction, and configured to phase-modulate the light output from the optical directional coupler and apply the phase-modulated light to the optical fiber of the optical cable; and a depolarizer connected to the second arm in the second direction and configured to stabilize an interference signal by eliminating a polarization component from input light.

3. The optical cable identification apparatus of claim 2, wherein the phase modulator, the optical directional coupler, the optical fiber of the optical cable, and the depolarizer configured to function as an optical fiber interferometer.

4. The optical cable identification apparatus of claim 3, wherein the optical fiber interferometer is a Sagnac interferometer.

5. An optical cable identification apparatus for identifying an optical cable by looping-back one end of each of two strands of optical fiber in an optical cable to be identified and applying a disturbance to the optical cable to be identified, the optical cable identification apparatus comprising:

an optical unit configured to apply light to the two strands of the optical fiber in the optical cable to be identified after phase-modulating the light at a predetermined modulation frequency, interfere the light applied to the two strands in opposite directions, and detect light having a different intensity resulting from a phase difference due to the phase modulation and a phase difference due to the disturbance of the optical cable;

a signal processor configured to receive a signal of the detected light, and demodulate the signal to an audio signal; and a sound output unit configured to receive the audio signal from the signal processor and transform the audio signal into a sound, wherein the signal processor comprises:

a switch configured to select a demodulation frequency;

a controller configured to control an output of a demodulation frequency that corresponds to a selection of the switch;

a function generator configured to supply a predetermined modulation frequency to the optical unit, and output a demodulation frequency that corresponds to a control signal of the controller; and an amplitude extract unit configured to extract an amplitude of a demodulation frequency component from the signal received from the optical unit, the demodulation frequency component being output from the function generator.

6. The optical cable identification apparatus of claim 5, wherein the controller configured to output a warning signal when the amplitude of the amplitude extract unit is saturated, and the signal processor further comprises a first mixer configured to mix the warning signal and a signal of the amplitude extract unit, and output the mixed result.

7. The optical cable identification apparatus of claim 6, wherein the sound output unit comprises:

a first jack connected to a mobile phone;
a second jack connected to a speaker;
a third jack connected to a microphone;
a second mixer configured to transmit an output of the mobile phone through the first jack and an output of the first mixer to the speaker through the second jack; and
a third mixer configured to transmit the output of the first mixer and an input to the microphone through the third jack to the mobile phone through the first jack.

8. A method for identifying an optical cable by looping back one direction of each of two strands of an optical fiber in an optical cable to be identified and applying a disturbance to the optical cable to be identified, the method comprising:

applying light to the two strands of the optical fiber of the optical cable;
phase-modulating the light applied to the two strands of the optical fiber at a predetermined modulation frequency and modulating a phase difference of the interfering lights at the modulation frequency;
additionally generating a phase difference due to an external disturbance between the interfering lights of the optical cable; and
measuring a phase difference due to the disturbance by demodulating a light signal, converting the light signal into an audio signal, and outputting the audio signal, wherein intensity of the light signal is modulated by the disturbance,
wherein the measuring of the phase difference due to the disturbance, converting of the light signal into the audio signal, and outputting of the audio signal comprises delaying outputting of the detected light signal for a predetermined time.

9. The method of claim 8, wherein when the light is applied to the two strands of the optical fiber in the optical cable, an optical fiber interferometer having the two strands is formed.

10. The method of claim 9, wherein the measuring of the phase difference due to the disturbance, converting of the light signal into the audio signal, and outputting of the audio signal comprise determining an amplitude component of light detected in accordance with a user's choice.

11. The method of claim 8, wherein the measuring of the phase difference due to the disturbance, converting of the light signal into the voice signal, and outputting of the voice signal comprises transmitting the voice signal to a worker at a remote site by outputting the audio voice-signal to a mobile communication device.

12. An optical cable identification apparatus for identifying an optical cable by detecting light that varies due to a disturbance, the disturbance applied to the optical cable after short-circuiting two strands of an optical fiber of the optical cable in one direction and the light applied to the two strands of the optical fiber in the other direction, the optical cable identification apparatus comprising:

an optical unit configured to phase-modulate and apply light to two strands of an optical fiber of an optical cable to be identified, and detect a disturbed light; and
a signal processor configured to receive a signal of the detected light, and demodulate the signal into an audio signal, wherein the signal processor comprises:

a switch configured to select a frequency;
a function generator configured to supply a predetermined frequency to the optical unit, and output a frequency corresponding to a selection signal of the switch; and
an amplitude extract unit configured to extract an amplitude of a frequency component from the signal, the frequency component being output from the function generator.

13. The optical cable identification apparatus of claim 12, wherein the signal processor further comprises:

an amplitude measure unit configured to output a warning signal when the amplitude of the amplitude extract unit is saturated; and
a first mixer configured to mix the warning signal and a signal of the amplitude extract unit, and output a mixed result.

14. The optical cable identification apparatus of claim 12, wherein the signal processor configured to use a demodulation scheme, and extract an amplitude of a frequency component that corresponds to a modulation frequency of the optical unit or two times the modulation frequency.

15. An optical cable identification apparatus for identifying an optical cable by looping-back one end of each of two strands of optical fiber in an optical cable to be identified and applying a disturbance to the optical cable to be identified, the optical cable identification apparatus comprising:

an optical unit configured to apply light to the two strands of the optical fiber in the optical cable to be identified after phase-modulating the light at a predetermined modulation frequency. interfere the light applied to the two strands in opposite directions, and detect light having a different intensity resulting from a phase difference due to the phase modulation and a phase difference due to the disturbance of the optical cable;
a signal processor configured to receive a signal of the detected light, and demodulate the signal to an audio signal; and
sound output unit configured to receive the audio signal from the signal processor and transform the audio signal into a sound,
wherein the signal processor comprises:

a switch configured to select a demodulation frequency;
a controller configured to control an output of a demodulation frequency that corresponds to a selection of the switch;
a function generator configured to supply a predetermined modulation frequency to the optical unit, and output a demodulation frequency that corresponds to a control signal of the controller; and
an amplitude extract unit configured to extract an amplitude of a demodulation frequency component from the signal received from the optical unit, the demodulation frequency component being output from the function generator.

16. The optical cable identification apparatus of claim 15, wherein the signal processor further comprises:

an amplitude measure unit configured to output a warning signal when the amplitude extracted by the amplitude extract unit is saturated; and
a first mixer configured to mix the warning signal and a signal from the amplitude extract unit, and output a mixed result.

* * * * *

UNITED STATES PATENT AND TRADEMARK OFFICE
CERTIFICATE OF CORRECTION

| | |
|---|---|
| PATENT NO. | : 7,505,643 B2 |
| APPLICATION NO. | : 11/508743 |
| DATED | : March 17, 2009 |
| INVENTOR(S) | : Lee et al. |

Page 1 of 1

It is certified that error appears in the above-identified patent and that said Letters Patent is hereby corrected as shown below:

In Column 6, Line 32, please change "l(t)" to -- I(t) --.

In Column 11, Line 52, Claim 11, delete "voice-" after "audio",

In Column 12, Line 4, Claim 12, delete "," after "unit".

In Column 12, Line 40, Claim 15, insert -- a -- before "sound".

In Column 12, Lines 45, 46, and 47, Claim 15, delete "a controller configured to control an output of a demodu-lation frequency that corresponds to a selection of the switch;".

In Column 12, Lines 48 and 49, Claim 15, replace "predeter-mined" with -- constant --.

In Column 12, Line 51, Claim 15, replace "control" with -- selection --.

In Column 12, Line 51, Claim 15, replace "controller" with -- switch --.

In Column 12, Lines 52 and 53, Claim 15, delete "an ampli-tude of" after "extract".

In Column 12, Line 54, Claim 15, delete "received" after "signal".

Signed and Sealed this

Third Day of August, 2010

David J. Kappos
*Director of the United States Patent and Trademark Office*